G. D. POGUE.
MULTIPLE FEED LUBRICATING SYSTEM.
APPLICATION FILED JUNE 26, 1917.

1,301,004.

Patented Apr. 15, 1919.
3 SHEETS—SHEET 1.

Inventor,
George D. Pogue.
By Boswell & Church, Attys.

G. D. POGUE.
MULTIPLE FEED LUBRICATING SYSTEM.
APPLICATION FILED JUNE 26, 1917.
1,301,004.
Patented Apr. 15, 1919.
3 SHEETS—SHEET 2.
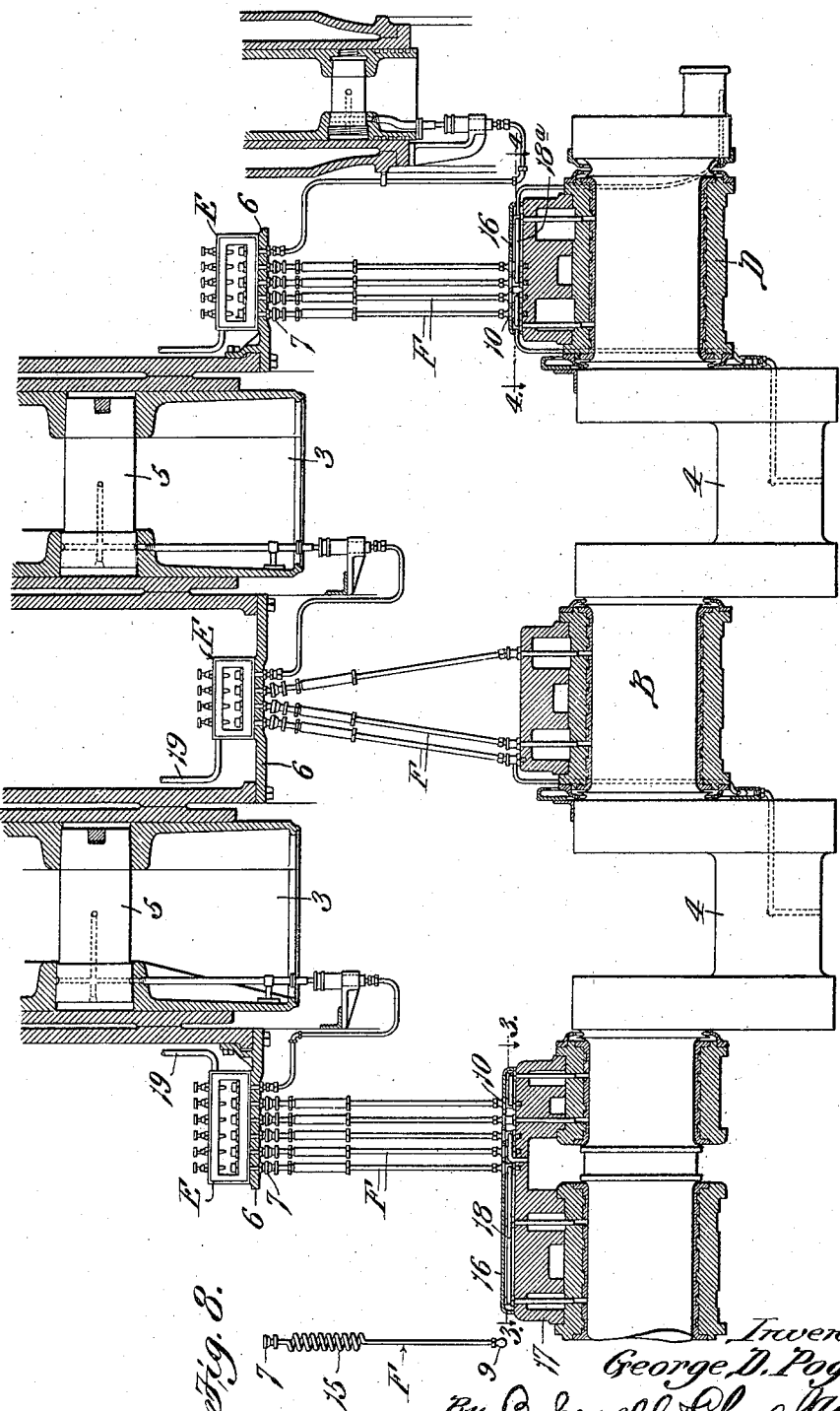

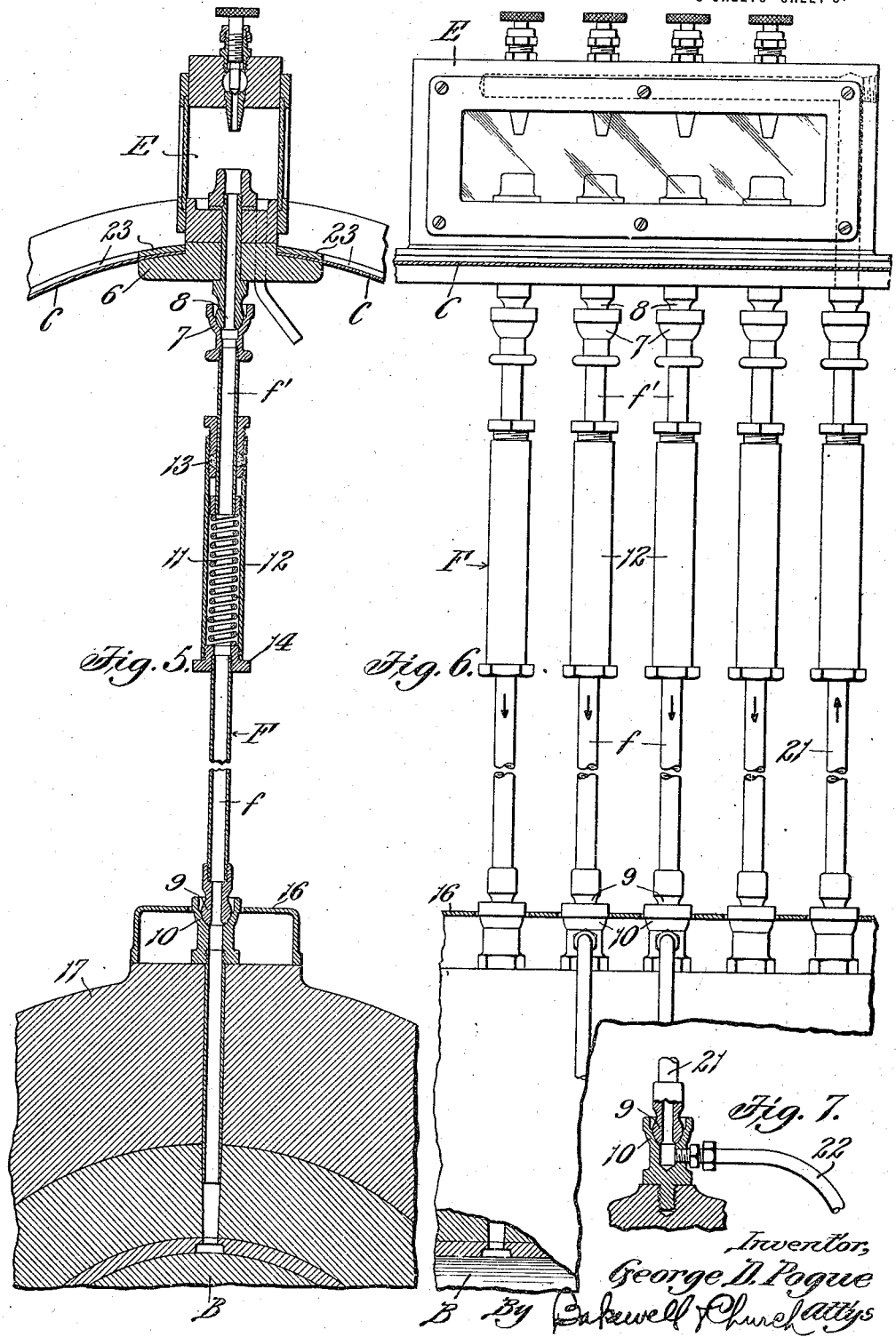

UNITED STATES PATENT OFFICE.

GEORGE D. POGUE, OF ST. LOUIS, MISSOURI.

MULTIPLE-FEED LUBRICATING SYSTEM.

1,301,004. Specification of Letters Patent. Patented Apr. 15, 1919.

Application filed June 26, 1917. Serial No. 176,968.

*To all whom it may concern:*

Be it known that I, GEORGE D. POGUE, a citizen of the United States, residing at St. Louis, Missouri, have invented a certain new and useful Improvement in Multiple-Feed Lubricating Systems, of which the following is a full, clear, and exact description, such as will enable others skilled in the art to which it appertains to make and use the same.

This invention relates to multiple feed lubricating systems for engines and machines, namely, lubricating systems of the type in which oil is fed to the bearings and other parts of an engine or machine through a plurality of pipes that lead from multiple sight feed lubricators.

Prior to my invention lubricating systems of the type referred to comprised a network of small oil conducting pipes that were arranged on the exterior of the machine in such a manner that numerous screw-threaded fittings had to be disconnected and the oil conducting pipes removed whenever it became necessary to examine or adjust the bearings and other internal parts of the machine. Consequently, multiple feed lubricating systems of the kind referred to are considered objectionable on account of the time and labor involved in removing the oil conducting pipes before a bearing or other internal part of the machine can be inspected or adjusted. They are also considered objectionable on account of the unsightly appearance of the oil conducting pipes on the exterior of the machine.

One object of my invention is to provide a multiple feed lubricating system for engines and machines which is so constructed that the parts which interfere with accessibility to the interior of the machine can be removed quickly and without the aid of wrenches or other tools.

Another object is to provide a multiple feed lubricating system of the character above described, which is so constructed that the caps of the crank shaft bearings can be removed quickly and easily and without the necessity of first unscrewing a number of pipe fittings.

Another object is to provide a multiple feed lubricating system for engines and machines in which the oil conducting pipes each consist of two telescoped sections, joined together by oil-tight joints, and connected to the parts with which they coöperate by connecting members which permit said pipes to be arranged at an angle without forming bends in the pipes.

Another object is to provide a multiple feed lubricating system in which only a comparatively few symmetrically arranged oil conducting pipes are exposed to view.

Another object is to provide a novel housing that is adapted to be used with an engine or machine equipped with A frames for closing the spaces between adjacent frames, said housing comprising portions on which sight feed lubricators can be mounted.

Another object is to provide a support for the sheet metal housings which connect the several crank inclosures of an A frame engine, which support is arranged to receive a multiple-feed lubricator from which oil is fed through a plurality of telescopic down-pipes to the main bearings and other bearings of the machine.

Another object is to provide a conduit or cover for the horizontal runs of piping on the main bearing caps of the machine, which horizontal runs are necessary to permit of a symmetrical arrangement of the down-pipes which lead from the multiple feed lubricators, the conduit or cover being so designed that it may be placed in position after the horizontal runs and coöperating socket fittings are placed in position.

This feature is clearly disclosed in British Patent No. 454 of 1912. Other objects and desirable features of my invention will be hereinafter pointed out.

Figure 1 of the drawings is a perspective view, illustrating a four cylinder Diesel engine equipped with a multiple feed lubricating system and a housing constructed in accordance with my invention.

Fig. 2 is a vertical sectional view, illustrating my invention embodied in a two cylinder engine.

Figs. 3 and 4 are sectional views, taken on the lines 3—3 and 4—4, respectively of Fig. 2.

Fig. 5 is an enlarged vertical sectional view, illustrating one of the sight feed lubricators and one of the oil conducting pipes that lead from same to a part that requires lubrication.

Fig. 6 is a front elevational view of one of the sight feed lubricators and the oil conducting pipes that lead from same, the lubricator shown in Fig. 6 also being provided with an up-take pipe.

Fig. 7 is a detail sectional view, illustrating a branch pipe through which oil under pressure is supplied to the up-take pipe shown in Fig. 6; and Fig. 8 is a detail view, showing an oil conducting pipe provided intermediate its ends with a coil which permits said pipe to be sprung into and out of operative position with the parts with which it coöperates.

Figure 1:
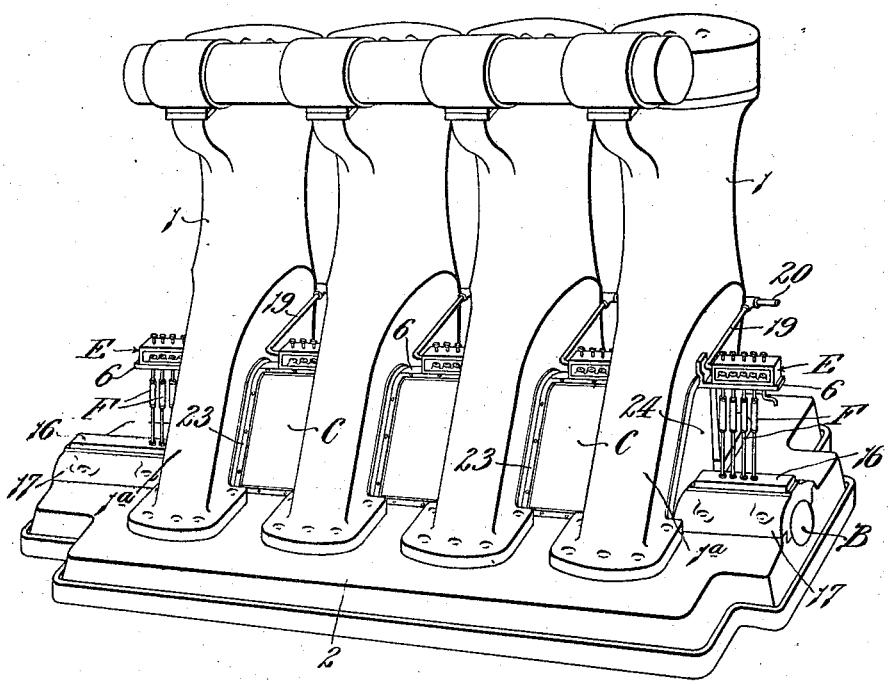

Referring to the drawings, which illustrate my invention embodied in a Diesel engine, 1 designates a plurality of members commonly termed A frames that are mounted on a supporting base 2, said A frames being spaced apart and each frame being provided with a vertically-disposed portion that contains a cylinder in which a piston 3 is reciprocatingly mounted, as shown in Fig. 2. The crank shaft B extends longitudinally of the base 2 between the legs 1ª of the A frames, and the spaces between said legs are closed by a plurality of housing members C of novel construction, which will be hereinafter described. Lubricating oil is supplied to the crank shaft bearings D and certain other parts of the engine, for example, the crank pins 4 and the bearings for the piston pins 5, by a multiple feed lubricating system which comprises a plurality of sight feed lubricators E that are arranged between the A frames and at points outside of the end A frames, as shown in Fig. 1, each of said lubricators having combined therewith a plurality of oil conducting pipes F that lead to the bearings or parts which require lubrication. The lubricators E, which may be of any preferred construction, are mounted on horizontally-disposed supporting members 6 that are secured to the A frames 1 at the points where the side legs 1ª of said A frames start to diverge. In a four cylinder engine, as shown in Fig. 1, three lubricators are arranged between the four A frames on members 6 whose opposite ends are secured to the A frames, and two lubricators are arranged at the ends of the engine on supporting members 6 that project laterally from the two end A frames. The oil conducting pipes F that lead from the intermediate lubricators are hidden from view by the housing members C, but the oil conducting pipes that lead from the end lubricators are preferably exposed to view and are disposed vertically in parallel relation to each other.

Said oil conducting pipes are constructed in such a manner that they can be disconnected quickly from the lubricators and the parts to which they lead without the aid of wrenches or other tools. In the preferred form of my invention, as herein shown, the oil conducting pipes are provided with ball and socket members that coöperate with ball and socket members on the lubricators and on the parts to which the oil conducting pipes lead, and said pipes are also constructed in such a manner that the ball and socket members on same can be easily sprung into and out of engagement with the ball and socket members with which they coöperate, thereby enabling the oil conducting pipes to be removed or arranged in operative position without the aid of wrenches or other tools and also enabling the oil conducting pipes to be arranged at an angle or in an inclined position. One convenient way of constructing the oil pipes F is to provide each pipe with a socket member 7, as shown in Fig. 5, that receives a ball member 8 on the underside of the lubricator E with which said pipe coöperates, the lower end of said pipe being provided with a ball member 9 that projects into a socket member 10 on the bearing or part to which the pipe leads. The pipe can be constructed in various ways so as to permit the ball and socket members on same to be sprung into and out of engagement with the parts with which they coöperate, but I prefer to form each pipe from two sections $f$ and $f'$ that are normally forced apart by means of a coiled expansion spring 11 that is arranged between said pipe sections in a tubular member 12 provided at its upper end with a stuffing box 13 in which the upper section $f'$ slides and having its lower end closed by a nut or plug 14 into which the bottom section $f$ is screwed. To disconnect the pipe it is only necessary to move one section of the pipe toward the other so as to reduce the length of the pipe, and thus permit the connecting member at one end of same to be moved out of engagement with the connecting member with which it coöperates. Thereafter, the connecting member at the opposite end of the pipe can be disconnected from the member with which it coöperates. While I prefer to form the oil conducting pipes in the manner above described, it is not essential that they be constructed in this manner, as the same result could be accomplished in various other ways without departing from the spirit of my invention. For example, each pipe could be formed from a continuous piece of tubing and provided intermediate its ends with a coil 15, as shown in Fig. 8, so as to impart sufficient flexibility to the pipe to permit the connecting members at the ends of same to be sprung into and out of engagement with the parts with which they coöperate.

Figure 3:
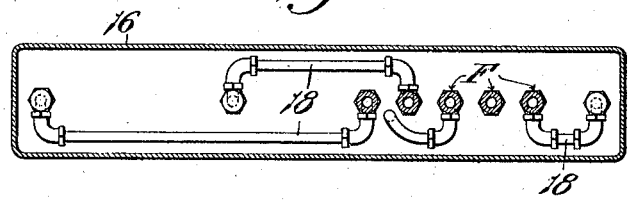
Figure 4:
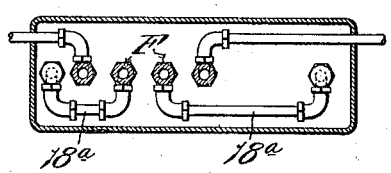

The oil conducting pipes that coöperate with the intermediate lubricator or lubricators, depending on whether the engine or machine is provided with two cylinders or three or more cylinders, supply oil to the intermediate crank shaft bearings and to the intermediate crank pins. Said pipes can be arranged at an angle, as shown in Fig. 2, without detracting from the appearance of the engine, owing to the fact that they are hidden from view by the housing members C. The oil conducting pipes that coöperate with the end lubricators, however, are arranged vertically and in parallel relation to each other so that the engine will have a symmetrical appearance. I accomplish this by providing the caps of the end crank shaft bearings with distributing pipes to which the conducting pipes from the end lubricators are connected, said distributing pipes being hidden from view by cover plates 16 carried by the caps of the end crank shaft bearings. As shown in Fig. 3, the cap 17 of the crank shaft bearing at the left hand end of the engine is provided with a plurality of horizontally-disposed distributing pipes 18 that extend longitudinally of said bearing to the various points on same which require lubrication, each of said distributing pipes 18 leading away from a socket member 10 that receives a ball-shaped member 9 on one of the conducting pipes F. The crank shaft bearing at the right hand end of the engine is formed in a similar manner and is provided with a plurality of horizontally-disposed distributing pipes 8ª, as shown in Fig. 4. The oil can be supplied to the lubricators E by branch pipes 19 that lead from an exposed oil manifold or supply header 20, as shown in Fig. 1, or each of the lubricators E can be provided with an up-take pipe 21 whose lower end communicates with a branch 22, as shown in Fig. 7, that leads from a supply manifold that is hidden from view by the housing members C.

The housing members C are formed from sheet metal or other suitable material and are so constructed that they can be removed and arranged in operative position easily and also shipped from the manufacturer to the point where the engine is installed without liability of being bent out of shape. Each of said housing members consists of a plate whose side edges bear against the A frames between which it is arranged and whose upper edge laps over the lubricator supporting member 6 arranged between said A frames, the lower edge of said housing member resting upon the base plate 2 of the engine. If desired, the side edge portions of each housing member can be reinforced and strengthened by strips of metal 23 that are secured to same, as shown in Fig. 1. The open spaces in the two end A frames are closed by vertically-disposed cover plates 24 that extend transversely of the base of the engine, as shown in Fig. 1. Prior to my invention it was the general practice to use a one-piece member of substantially inverted U form to close the space between two adjacent A frames, but such members were cumbersome to handle and they could not be shipped conveniently without liability of being bent in transit. By providing the engine with housing members C of the kind herein shown I obtain a structure that can be shipped conveniently and also assembled and removed easily, owing to the fact that the complete housing between each pair of A frames is composed of a permanent central portion 6 and two removable side portions C which are of such size and shape that they can be handled conveniently and also nested together when they are shipped from the manufacturer to the point where the engine is to be installed, the permanent central portion 6 serving as a support for the side members C and also for the sight feed lubricator E that is arranged between the A frames.

A multiple feed lubricating system of the construction above described does not detract from the external appearance of the engine or machine on which it is used, as most of the parts of same are hidden from view and those parts which are exposed to view are symmetrically arranged. Another desirable feature of such a lubricating system is that the oil distributing pipes of same can be removed quickly without the necessity of using wrenches or other tools, thereby enabling a bearing or other internal part to be inspected or adjusted quickly. The ball and socket connecting members that are used for securing the oil conducting pipes to the parts with which they coöperate form oil tight connections between said elements and they also permit the inclosed pipes to be arranged in an inclined position without the necessity of forming bends in the pipes. While it is not essential to provide the caps of the end crank shaft bearings with distributing pipes of the kind previously described, I prefer to construct the end crank shaft bearing caps in this manner, as such a structure permits the oil conducting pipes leading from the end lubricators to be arranged vertically and in parallel relation to each other, instead of in an inclined position.

Having thus described my invention, what I claim, and desire to secure by Letters Patent, is:

1. A lubricating system for engines and machines, comprising a sight feed lubricator to which oil is supplied, an oil conducting pipe leading from said lubricator to a part that requires lubrication, said pipe comprising two sections that are connected by ball and socket joints to said lubricator and part, a tubular member connected to one of said pipe sections and provided with a stuffing box in which one end of the other pipe section is telescoped, and a spring in said tubular member that tends to force the sections of the pipe apart.

2. In an engine or machine provided with a plurality of spaced A frames, a plurality of multiple feed sight lubricators, one of which is arranged intermediate a pair of said frames, oil conducting pipes leading from said lubricators to the crank shaft bearings of the machine, spring-pressed ball and socket connecting joints for securing said pipes to said lubricators and to said bearings, the conducting pipes leading from the end lubricators being arranged in parallel relation to each other, and distributing pipes on the end crank shaft bearings of the machine that communicate with the conducting pipes which lead from the end lubricators.

3. In an engine or machine provided with a plurality of spaced A frames, a plurality of multiple feed sight lubricators, one of which is arranged intermediate a pair of said frames, oil conducting pipes leading from said lubricators to the crank shaft bearings of the machine, spring-pressed ball and socket connecting joints for securing said pipes to said lubricators and to said bearings, the conducting pipes leading from the end lubricators being arranged in parallel relation to each other, distributing pipes on the end crank shaft bearings of the machine that communicate with the connecting pipes which lead from the end lubricators, and cover plates on the caps of the end bearings that hide said distributing pipes from view.

4. In an engine or machine provided with a plurality of spaced A frames, a horizontally-disposed supporting member arranged intermediate a pair of said frames at the point where the side legs of same start to diverge, a multiple feed lubricator carried by said supporting member, removable housing members arranged between said A frames and having their upper ends contacting with said supporting member, and oil-conducting pipes leading from said lubricator to one of the crank shaft bearings of the machine.

5. An engine or machine provided with a plurality of spaced A frames, a plurality of multiple feed sight lubricators arranged between said frames and at points outside of the end frames, horizontally-disposed supporting members secured to the A frames that carry said lubricators, housing members arranged between the A frames with their upper edges resting on the intermediate supporting members, spring-pressed, telescoped conducting pipes leading from said lubricators to the crank shaft bearings of the machine, and ball and socket connecting joints between said conducting pipes and said lubricators and bearings.

6. In a lubricating system for engines and machines, a sight feed lubricator adapted to receive lubricating oil, and a plurality of conducting pipes leading from said lubricator to one of the main bearings of the machine, each of said lubricating pipes consisting of a plurality of separated sections inclosed in a sleeve and a resilient means arranged in said sleeve between said sections for forcing said sections in opposite directions so as to hold the ends of same in engagement with the parts with which said sections coöperate.

7. In a multiple feed lubricating system for engines and machines, a sight feed lubricator to which oil is supplied, ball members on said lubricator, a plurality of oil conducting pipes leading from said lubricator and each provided with a socket piece that coöperates with one of the ball members on said lubricator, and resilient means for holding said ball members in engagement with their coöperating socket members.

GEORGE D. POGUE.

Copies of this patent may be obtained for five cents each, by addressing the "Commissioner of Patents, Washington, D. C."